(12) United States Patent
Katz et al.

(10) Patent No.: US 10,203,881 B2
(45) Date of Patent: Feb. 12, 2019

(54) OPTIMIZED EXECUTION OF INTERLEAVED WRITE OPERATIONS IN SOLID STATE DRIVES

(75) Inventors: Shachar Katz, Herut (IL); Oren Golov, Hod-Hasharon (IL)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 13/539,632

(22) Filed: Jul. 2, 2012

(65) Prior Publication Data

US 2013/0159626 A1 Jun. 20, 2013

Related U.S. Application Data

(60) Provisional application No. 61/577,125, filed on Dec. 19, 2011.

(51) Int. Cl.
G06F 12/00 (2006.01)
G06F 3/06 (2006.01)
G06F 12/02 (2006.01)
G06F 12/0866 (2016.01)

(52) U.S. Cl.
CPC ............. G06F 3/061 (2013.01); G06F 3/064 (2013.01); G06F 3/0608 (2013.01); G06F 3/0679 (2013.01); G06F 12/0246 (2013.01); G06F 12/0866 (2013.01); G06F 2212/7208 (2013.01)

(58) Field of Classification Search
CPC .. G06F 12/08; G06F 12/0866; G06F 12/0868; G06F 3/0656; G06F 3/06; G06F 12/0246; G06F 2212/7208
See application file for complete search history.

(56) References Cited

U.S. PATENT DOCUMENTS

| 6,668,343 | B1 * | 12/2003 | Kim et al. ............... 714/702 |
| 6,986,019 | B1 * | 1/2006 | Bagashev et al. ........ 711/217 |
| 7,024,596 | B2 * | 4/2006 | Xin ........................... 714/702 |
| 7,392,340 | B1 * | 6/2008 | Dang et al. ............... 711/111 |
| 7,644,340 | B1 * | 1/2010 | Liu ........................... 714/762 |
| 8,145,858 | B2 | 3/2012 | Kinoshita |
| 8,255,615 | B1 | 8/2012 | Yoon et al. |
| 8,332,569 | B2 | 12/2012 | Kim et al. |
| 8,738,841 | B2 | 5/2014 | Olbrich et al. |
| 2005/0160342 | A1 * | 7/2005 | Wellig et al. ............ 714/755 |
| 2009/0204872 | A1 * | 8/2009 | Yu et al. .................. 714/773 |

(Continued)

OTHER PUBLICATIONS

H.Park, D. Shin "Buffer flush and address mapping scheme for flash memory solid-state disk" Journal of Systems Architecture 56, Apr. 4, 2010.*

(Continued)

*Primary Examiner* — Francisco A Grullon

(74) *Attorney, Agent, or Firm* — Meyertons, Hood, Kivlin, Kowert & Goetzel, P.C.; Erik A. Heter

(57) ABSTRACT

A method for data storage includes receiving a plurality of data items for storage in a memory, including at least first data items that are associated with a first data source and second data items that are associated with a second data source, such that the first and second data items are interleaved with one another over time. The first data items are de-interleaved from the second data items, by identifying a respective data source with which each received data item is associated. The de-interleaved first data items and the de-interleaved second data items are stored in the memory.

20 Claims, 2 Drawing Sheets

(56) References Cited

U.S. PATENT DOCUMENTS

2010/0042899 A1* 2/2010 Pu et al. .................. 714/763
2012/0069657 A1 3/2012 Choi et al.

OTHER PUBLICATIONS

S.Park, E. Seo, J. Shin, S. Maeng "Exploiting Internal Parallelism of Flash-based SSDs" IEEE Computer Architecture Letters, vol. 9, No. 1, Feb. 26, 2010.*

J.Kang, J. Kim, C. Park, H. Park, J. Lee "A multi-channel architecture for high-performance NAND flash-based storage system" Journal of Systems Architecture 53, Feb. 1, 2007.*

Y.Hu, H. Jiang, D. Feng, L. Tian, H. Luo, S. Zhang "Performance Impact and Interplay of SSD Parallelism through Advanced Commands, Allocation Strategy and Data Granularity" ICS'11, May 31-Jun. 4, 2011.*

* cited by examiner

OPTIMIZED EXECUTION OF INTERLEAVED WRITE OPERATIONS IN SOLID STATE DRIVES

CROSS-REFERENCE TO RELATED APPLICATIONS

This application claims the benefit of U.S. Provisional Patent Application 61/577,125, filed Dec. 19, 2011, whose disclosure is incorporated herein by reference.

FIELD OF THE INVENTION

The present invention relates generally to data storage, and particularly to methods and systems for storing data from multiple data sources.

BACKGROUND OF THE INVENTION

Data storage devices, such as Solid State Drives (SSDs) and enterprise storage systems, use various storage protocols for transferring data to and from storage. One example of a storage protocol is the Serial Attached SCSI (SAS) protocol developed by the International Committee for Information Technology Standards (INCITS). The SAS protocol is described, for example, in "Information Technology—Serial Attached SCSI-2 (SAS-2)," INCITS document T10/1760-D, revision 15a, Feb. 22, 2009, which is incorporated herein by reference.

SUMMARY OF THE INVENTION

An embodiment of the present invention that is described herein provides a method for data storage. The method includes receiving a plurality of data items for storage in a memory, including at least first data items that are associated with a first data source and second data items that are associated with a second data source, such that the first and second data items are interleaved with one another over time. The first data items are de-interleaved from the second data items, by identifying a respective data source with which each received data item is associated. The de-interleaved first data items and the de-interleaved second data items are stored in the memory.

In some embodiments, storing the first data items and the second data items includes storing the first data items in a first consecutive range of physical addresses of the memory, and storing the second data items in a second consecutive range of the physical addresses, different from the first range. In other embodiments, storing the first data items includes caching the first data items prior to storage in a first cache memory, and storing the second data items includes caching the second data items prior to the storage in a second cache memory, separate from the first cache memory. In alternative embodiments, the memory includes multiple memory devices, and storing the first data items includes distributing the de-interleaved first data items across two or more of the memory devices, so as to enable parallel readout of the first data items.

In a disclosed embodiment, identifying the respective data source with which each received data item is associated includes identifying received data items having sequential Logical Block Addresses (LBAs). In an embodiment, the method includes initially storing the received data items in the memory without de-interleaving, and de-interleaving the first data items from the second data items includes retrieving the initially-stored first and second data items from the memory and de-interleaving the retrieved first and second data items.

In another embodiment, identifying the data source with which a given data item is associated includes deducing the data source from an advance notification of a storage command that includes the given data item. In yet another embodiment, identifying the data source with which a given data item is associated includes deducing the data source from control information, which is sent together with the given data item and is indicative of the data source.

In an embodiment, the first data items belong to a first write command and the second data items belong to a second write command, different from the first storage command. In an embodiment, receiving the data items includes receiving the first data items over a first physical port, and receiving the second data items over a second physical port, different from the first physical port.

There is additionally provided, in accordance with an embodiment of the present invention, a data storage apparatus including a memory and a processor. The processor is configured to receive a plurality of data items for storage in the memory, including at least first data items that are associated with a first data source and second data items that are associated with a second data source, such that the first and second data items are interleaved with one another over time, to de-interleave the first data items from the second data items by identifying a respective data source with which each received data item is associated, and to store the de-interleaved first data items and the de-interleaved second data items in the memory.

There is additionally provided, in accordance with an embodiment of the present invention, a data storage apparatus including a memory and a processor. The processor is configured to receive a plurality of data items for storage in the memory, including at least first data items that are associated with a first data source and second data items that are associated with a second data source, such that the first and second data items are interleaved with one another over time, to de-interleave the first data items from the second data items by identifying a respective data source with which each received data item is associated, and to store the de-interleaved first data items and the de-interleaved second data items in the memory.

The present invention will be more fully understood from the following detailed description of the embodiments thereof, taken together with the drawings in which:

DETAILED DESCRIPTION OF EMBODIMENTS

Overview

In various data storage applications, a storage device receives data for storage from multiple data sources in an interleaved manner. For example, the SAS protocol allows a host to send data associated with multiple write commands in an interleaved manner. A Solid State Drive (SSD) operating in accordance with the SAS protocol may thus receive from the host multiple data streams that are interleaved with one another. As another example, in the Serial Advanced Technology Attachment (SATA) protocol, multiple applications running in parallel on a host may send to an SSD data associated with different tags in an interleaved manner. As yet another example, an SSD may receive multiple data streams concurrently over multiple different physical ports, so that the data of the different streams may be interleaved with one another when arriving in the SSD.

When storing the data in non-volatile memory, however, storing the data in a fragmented manner, in accordance with its time-of-arrival, will typically cause considerable performance degradation during both programming and readout. It is highly desirable for the SSD to process the data of each data stream separately from the other streams.

Embodiments of the present invention that are described herein provide improved methods and systems for storing data originating from multiple data sources. In some embodiments, a storage device (e.g., an SSD) comprises a non-volatile memory (e.g., a plurality of Flash memory devices) and a processor (e.g., an SSD controller). The processor receives multiple time-interleaved streams of data items, each stream associated with a respective data source.

The processor de-interleaves the various streams, by identifying the data source with which each data item is associated. In other words, the processor reconstructs the successive stream of data items associated with each data source. The processor stores the de-interleaved streams of data items in the non-volatile memory. Typically, the processor applies separate processing to each stream. For example, the processor may cache each stream in a separate cache memory. As another example, the processor may store each stream in a contiguous range of physical storage locations (physical addresses) of the non-volatile memory.

By storing the de-interleaved data streams rather than the interleaved data items, both write performance and subsequent readout performance can be improved considerably. For example, caching and read-ahead mechanisms can be used with high efficiency. Virtual-to-Physical address translation in the processor, as well as other management data structures, can be simplified and reduced in size. The frequency of lookup in such data structures can also be reduced.

System Description

Figure 1:
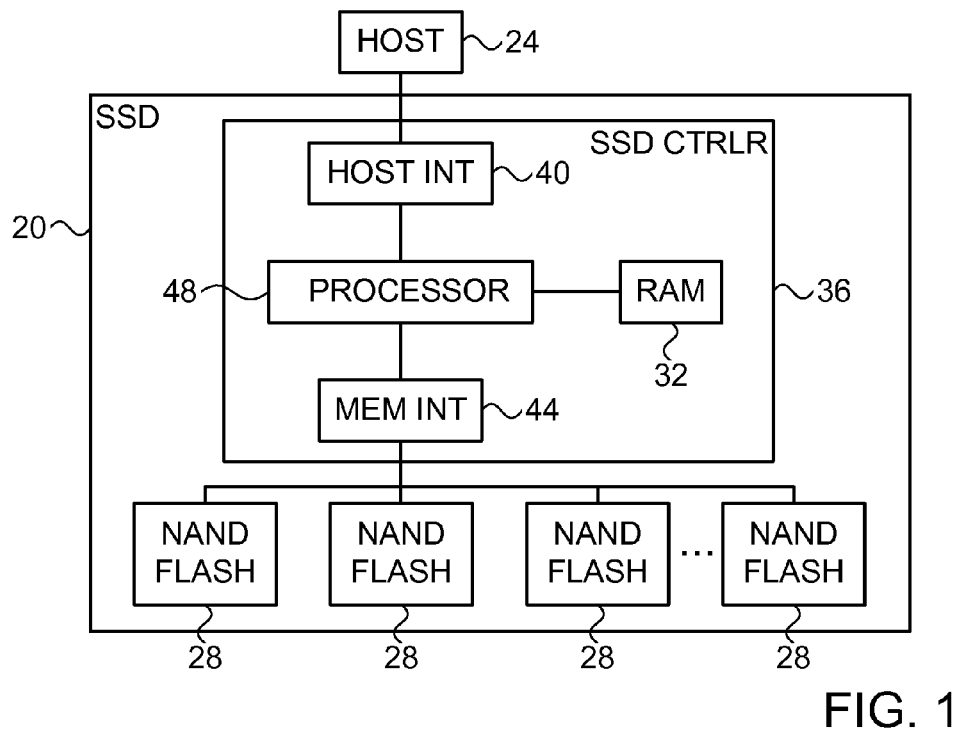
FIG. 1 is a block diagram that schematically illustrates a data storage system, in accordance with an embodiment of the present invention.

FIG. 1 is a block diagram that schematically illustrates a data storage system, in the present example a Solid State Drive (SSD) 20, in accordance with an embodiment of the present invention. SSD 20 stores data on behalf of a host 24. For example, SSD 20 may be installed in a mobile or personal computer, in which case host 24 comprises a Central Processing Unit (CPU) chipset of the computer. Alternatively, SSD 20 may be used with any other suitable host. Although the embodiments described herein refer mainly to SSD, the disclosed techniques can be used with various other kinds of memory systems, such as enterprise storage devices, mobile phones, digital cameras, mobile computing devices such as laptop computers, tablet computers or Personal Digital Assistants (PDAs), media players, removable memory cards or devices, or any other suitable data storage system.

SSD 20 stores data on behalf of host 24 in a non-volatile memory, in the present example in one or more NAND Flash memory devices 28. In alternative embodiments, the non-volatile memory in SSD 20 may comprise any other suitable type of non-volatile memory, such as, for example, NOR Flash, Charge Trap Flash (CTF), Phase Change RAM (PRAM), Magnetoresistive RAM (MRAM) or Ferroelectric RAM (FeRAM).

An SSD controller 36 performs the various storage and management tasks of the SSD, and in particular carries out data de-interleaving schemes that are described below. The SSD controller is also referred to generally as a memory controller. SSD controller 36 comprises a host interface 40 for communicating with host 24, a memory interface 44 for communicating with Flash devices 28, and a processor 48 that carries out the methods described herein.

SSD 20 further comprises a volatile memory, in the present example a Random Access Memory (RAM) 32. In the embodiment of FIG. 1 RAM 32 is shown as part of SSD controller 36, although the RAM may alternatively be separate from the SSD controller. In various embodiments, the volatile memory in SSD 20 may comprise any suitable type of volatile memory, such as, for example, Dynamic RAM (DRAM), Double Data Rate DRAM (DDR DRAM) or Static RAM (SRAM).

SSD controller 36, and in particular processor 48, may be implemented in hardware. Alternatively, the SSD controller may comprise a microprocessor that runs suitable software, or a combination of hardware and software elements.

The configuration of FIG. 1 is an exemplary configuration, which is shown purely for the sake of conceptual clarity. Any other suitable SSD or other memory system configuration can also be used. Elements that are not necessary for understanding the principles of the present invention, such as various interfaces, addressing circuits, timing and sequencing circuits and debugging circuits, have been omitted from the figure for clarity. In some applications, e.g., non-SSD applications, the functions of SSD controller 36 are carried out by a suitable memory controller.

In the exemplary system configuration shown in FIG. 1, memory devices 28 and SSD controller 48 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 28 are disposed. Further alternatively, some or all of the functionality of SSD controller 36 can be implemented in software and carried out by a processor or other element of host 24. In some embodiments, host 24 and SSD controller 36 may be fabricated on the same die, or on separate dies in the same device package.

In some embodiments, SSD controller 36 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

De-Interleaving and Storage of Arriving Data Streams

Figure 2:
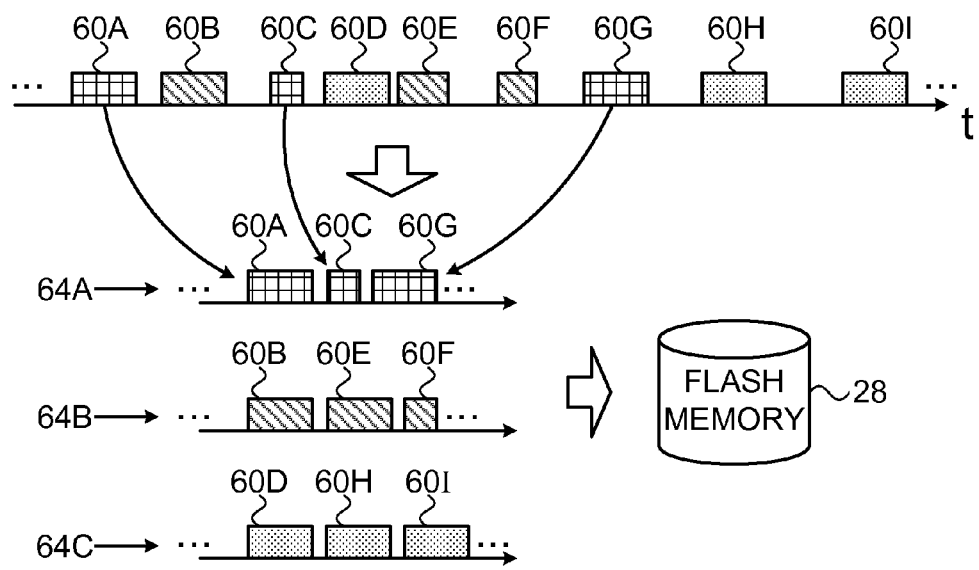
FIG. 2 is a diagram that schematically illustrates a process of storing multiple data streams, in accordance with an embodiment of the present invention.

FIG. 2 is a diagram that schematically illustrates a process of storing multiple data streams in SSD 20, in accordance with an embodiment of the present invention. The top graph of FIG. 2 shows an example of multiple data items 60A . . . 60I that are sent from host 24 to SSD 20 for storage. The data items are shown on a time axis in accordance with their order of arrival to SSD controller 36.

In the present example, data items 60A, 60C and 60G are associated with a data stream 64A, data items 60B, 60E and 60F are associated with another data stream 64B, and data items 60D, 60H and 60I are associated with a third data stream 64C. The three data streams are interleaved with one another in time.

The data items of each data stream are associated with a respective data source. In one example embodiment, each data stream may be associated with a different write command (e.g., with a different SAS command tag) and all arrive over the same physical port. As another example, each data stream may arrive in SSD 20 over a different physical port.

In some embodiments, processor 48 of SSD controller 36 de-interleaves the data items and thus reconstructs the three consecutive data streams. Data streams 64A . . . 64C after de-interleaving are shows at the bottom of FIG. 2. Processor 36 then sends the de-interleaved data streams for storage in Flash devices 28. The de-interleaved data streams are processed and sent for storage in Flash memory 28 devices of SSD 20.

Typically, processor 48 applies separate processing to each de-interleaved stream, in order to improve the overall write and/or read performance of SSD 20. In some embodiments, processor 48 stores the various streams so as to improve subsequent readout of the data items. In some embodiments, the de-interleaving and storage operations are performed while the data items of the various streams continue to arrive in the SSD.

For example, processor 48 may assign a separate cache memory to each data stream, i.e., cache the data items of each stream separately.

In other embodiments, processor 48 may assign a contiguous range of physical storage locations (physical addresses) in memory devices 28 to each stream. In these embodiments, each data item is typically provided by host together with a respective virtual address (logical address). Processor 48 translates the virtual addresses into corresponding physical addresses in memory devices 28, and stores the data items in the appropriate physical addresses.

When using the disclosed technique, processor 48 stores the data items of each stream sequentially in a respective contiguous range of physical addresses. As a result, subsequent readout of the data items will be highly efficient, because it will involve considerably fewer lookups in the virtual-to-physical address mapping, and will generally have the characteristics of sequential readout as opposed to random readout. Readout in these embodiments may make efficient use of caching and read-ahead (pre-fetch) mechanisms. Write performance can also be improved, for example because sequential write operations incur considerably less write amplification than random write operations.

Moreover, since long stretches of successive virtual addresses are mapped to contiguous ranges of physical addresses, the data structures used for storing and managing the virtual-to-physical address translation can be simplified and reduced in size.

Additionally or alternatively, processor 48 may apply any other suitable separate processing to the different streams, in order to improve write and/or read performance. For example, in tree-based Flash Translation Layers (FTLs), compaction and balancing of the tree is simpler for sequential write operation than for random write operations, and the tree occupies less memory. In resource-limited FTLs, e.g., FTLs that have very small RAM and that fetch data structures from the non-volatile memory, sequential write operation gives considerably better performance than random write operation. As yet another example, processor 48 may distribute the data of a given stream across multiple Flash devices (e.g., dies) in parallel, so as to enable fast parallel readout of the data.

Figure 3:
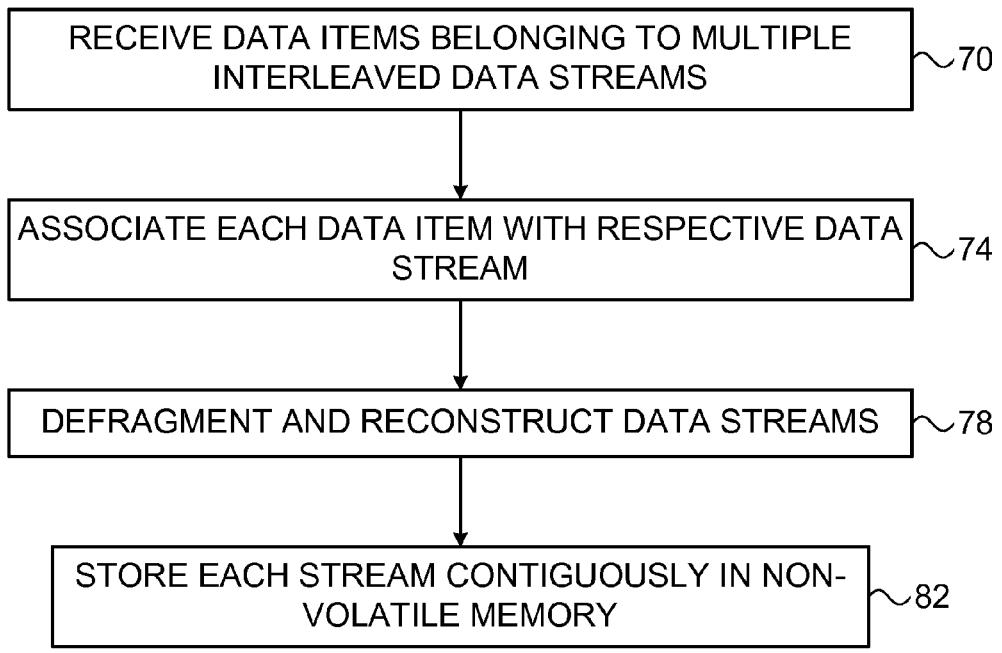
FIG. 3 is a flow chart that schematically illustrates a method for storing multiple data streams, in accordance with an embodiment of the present invention.

FIG. 3 is a flow chart that schematically illustrates a method for storing multiple data streams, in accordance with an embodiment of the present invention. The method begins with SSD controller 36 receiving from host 24 via host interface 40 data items for storage in Flash devices 28, at an input step 70. Each data item is associated with a respective data stream originating from a certain data source, and the various data streams are interleave in time with one another.

Processor 48 of SSD controller 36 identifies the respective data stream (and thus the data source) with which each data item is associated, at an association step 74. Processor 48 may identify the data stream to which a given data item belongs in various ways, and several example identification techniques are described below. Based on the identification above, processor 48 de-fragments or de-interleaves the different data streams from one another, at a de-interleaving step 78.

At this stage, the various data items of each stream are identified as belonging together and ready for subsequent processing. Processor 48 then processes each data stream individually, e.g., stores each data stream in a different contiguous physical address range, at a storage step 82.

In some embodiments, host 24 sends to the Flash translation Layer (FTL) in processor 48 an advance notification for each write command, prior to actual arrival of the data. Processor 48 associates the subsequent data with the appropriate stream based on these notifications. Each notification may comprise, for example, the tag of the command, the starting logical address (e.g., start Logical Block Address—LBA), the number of LBAs to be written, and/or any other information that will assist the FTL to associate the subsequent data with the context of the command. As another example, the storage protocol may provide "hints" that can be included in the notification. A hint typically provides the FTL additional knowledge regarding the profile of the stream and the expected behavior when it is read (e.g., low or high read latency and/or hot or cold data).

In another embodiment, host 24 sends every data item to the FTL of processor 48 along with control information that puts the data item in the context of a stream. The control information may comprise, for example, the tag of the command associated with this data, the port from which the data arrived, the initiator/host that sent the data, the offset of the data within the transaction, and/or any other suitable information.

In some embodiments, processor 48 maintains a dynamic database of the written segment LBAs that can be used to recognize patterns of sequential LBAs undergoing contiguous writes. For example, processor 48 can store an array that holds the last LBA of each recognized stream. When a new LBA arrives for storage, processor 48 may check, for each recognized stream in the array, whether the new LBA is the next LBA in this stream. If a sequential match is found, the new LBA is appended to the corresponding stream. If not, the processor assumes the new LBA starts a new stream, and initializes such a stream in the array. In some cases, a stream can span across the boundary of a single command. Dynamic stream detection of this sort can identify a stream even if it spans multiple commands, based on the LBA sequentiality. The beginning of a given detected stream may sometimes be stored in an interleaved manner, but the majority of the stream will typically be distinguished from other streams and processed accordingly.

Further alternatively, processor 48 may identify the stream (and thus the data source) to which each data item belongs in any other suitable way.

In embodiments described above, processor 48 performs de-interleaving on-the-fly to incoming data items, before sending them for storage in Flash devices 28. In alternative embodiments, processor 48 initially stores the incoming data items in memory 28 without de-interleaving, e.g., in accordance with the order they arrive from the host. In addition, processor 48 runs a background task that performs de-interleaving and storage according to affiliation with data streams. The background task may operate during idle times in which the processor is less busy. Such a task may detect LBA sequences that are stored in a fragmented manner in memory 28. The task typically rearranges (de-fragmenting) the data on the physical media of memory 28, and updates the virtual-to-physical address mapping accordingly, so as to achieve continuous data stripes. Using this technique, the content stored in SSD 20 can be read with an improved performance.

Although the embodiments described herein mainly address SSD, the methods and systems described herein can also be used in other applications, such as in Hard Disk Drives (HDD).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
receiving, by a processor, a plurality of data items for storage in a memory, including at least first data items that are associated with a first data source and second data items that are associated with a second data source, wherein the first and second data items are interleaved with one another over time;
wherein the first data items are associated with a first stream of logical block addresses (LBAs) and the second data items are associated with a second stream of LBAs;
de-interleaving the first data items from the second data items, by identifying a respective data source with which each received data item is associated; and
storing the de-interleaved first data items and the de-interleaved second data items in the memory, wherein storing the first data items comprises caching the first data items prior to storage in a first cache memory, and wherein storing the second data items comprises caching the second data items prior to the storage in a second cache memory separate from the first cache memory;
wherein identifying the respective data source with which each received data item is associated comprises:
identifying received data items having sequential LBAs;
determining if either of the first or second data streams spans across a boundary of a single command based on LBA sequentiality;
maintaining a database of LBAs that have been received from the first data source and the second data source; and
comparing, by the processor, each received LBA to LBAs in the database to dynamically determine to which stream each received LBA belongs.

2. The method according to claim 1, wherein storing the first data items and the second data items comprises storing the first data items in a first consecutive range of physical addresses of the memory, and storing the second data items in a second consecutive range of the physical addresses, different from the first range.

3. The method according to claim 1, wherein the memory comprises multiple memory devices, and wherein storing the first data items comprises distributing the de-interleaved first data items across two or more of the memory devices, so as to enable parallel readout of the first data items.

4. The method according to claim 1, further comprising initially storing the received data items in the memory without de-interleaving, wherein de-interleaving the first data items from the second data items comprises retrieving the initially-stored first and second data items from the memory and de-interleaving the retrieved first and second data items.

5. The method according to claim 1, wherein identifying the data source with which a given data item is associated comprises deducing the data source from an advance notification of a storage command that comprises the given data item.

6. The method according to claim 1, wherein identifying the data source with which a given data item is associated comprises deducing the data source from control information, which is sent together with the given data item and is indicative of the data source.

7. The method according to claim 1, wherein the first data items belong to a first write command, and wherein the second data items belong to a second write command different from the first write command.

8. The method according to claim 1, wherein receiving the data items comprises receiving the first data items over a first physical port, and receiving the second data items over a second physical port, different from the first physical port.

9. A data storage apparatus, comprising:
a memory; and
a processor, which is configured to:
receive a plurality of data items for storage in the memory, including at least first data items that are associated with a first data source and a first stream of logical block addresses (LBAs), and second data items that are associated with a second data source and a second stream of LBAs, wherein the first and second data items are interleaved with one another over time;
de-interleave the first data items from the second data items by identifying a respective data source with which each received data item is associated, wherein identifying the respective data source with which each received data item is associated comprises:
maintaining a database of LBAs that have been received from the first data source and the second data source; and comparing each received LBA to LBAs in the database to dynamically determine to which stream each received LBA belongs; and storing the de-interleaved first data items and the de-interleaved second data items in the memory, wherein the processor is configured to cache the first data items prior to storage in a first cache memory, and to cache the second data items prior to the storage in a second cache memory separate from the first cache memory;

wherein the processor is configured to identify the respective data source with which each received data item is associated by identifying received data items having sequential LBAs and whether received data items have sequential LBAs and further configured to determine if either of the first or second data streams spans across a boundary of a single command based on LBA sequentiality.

10. The apparatus according to claim 9, wherein the processor is configured to store the first data items in a first consecutive range of physical addresses of the memory, and to store the second data items in a second consecutive range of the physical addresses, different from the first range.

11. The apparatus according to claim 9, wherein the memory comprises multiple memory devices, and wherein the processor is configured to distribute the de-interleaved first data items across two or more of the memory devices, so as to enable parallel readout of the first data items.

12. The apparatus according to claim 9, wherein the processor is configured to initially store the received data items in the memory without de-interleaving, to retrieve the initially-stored first and second data items from the memory, and to de-interleave and store the retrieved first and second data items.

13. The apparatus according to claim 9, wherein the processor is configured to identify the data source with which a given data item is associated by deducing the data source from an advance notification of a storage command that comprises the given data item.

14. The apparatus according to claim 9, wherein the processor is configured to identify the data source with which a given data item is associated by deducing the data source from control information, which is sent together with the given data item and is indicative of the data source.

15. The apparatus according to claim 9, wherein the first data items belong to a first write command, and wherein the second data items belong to a second write command different from the first write command.

16. The apparatus according to claim 9, wherein the processor is configured to receive the first data items over a first physical port, and to receive the second data items over a second physical port, different from the first physical port.

17. A data storage apparatus, comprising:
an interface for communicating with a memory; and
a processor, which is configured to:
receive a plurality of data items for storage in the memory, including at least first data items that are associated with a first data source and second data items that are associated with a second data source, wherein the first and second data items are interleaved with one another over time;

wherein the first data items are associated with a first stream of logical block addresses (LBAs) and the second data items are associated with a second stream of LBAs;

de-interleave the first data items from the second data items by identifying a respective data source with which each received data item is associated;

maintain a database of LBAs that have been received from the first data source and the second data source;

compare each received LBA to LBAs in the database to dynamically determine to which stream each received LBA belongs and identify received data items having sequential LBAs;

determine if either of the first or second data streams spans across a boundary of a single command based on LBA sequentiality; and store the de-interleaved first data items and the de-interleaved second data items in the memory, wherein storing the first data items comprises caching the first data items prior to storage in a first cache memory, and wherein storing the second data items comprises caching the second data items prior to the storage in a second cache memory separate from the first cache memory.

18. The apparatus according to claim 17, wherein the processor is configured to store the first data items in a first consecutive range of physical addresses of the memory, and to store the second data items in a second consecutive range of the physical addresses, different from the first range.

19. The apparatus according to claim 17, wherein the processor is configured to initially store the received data items in the memory without de-interleaving, to retrieve the initially-stored first and second data items from the memory, and to de-interleave and store the retrieved first and second data items.

20. The apparatus according to claim 17, wherein the memory comprises multiple memory devices, and wherein the processor is configured to distribute the de-interleaved first data items across two or more of the memory devices, so as to enable parallel readout of the first data items.

* * * * *